Nov. 6, 1956 G. D. PAXSON 2,769,903
PULSE FORMING NETWORK
Filed June 23, 1953
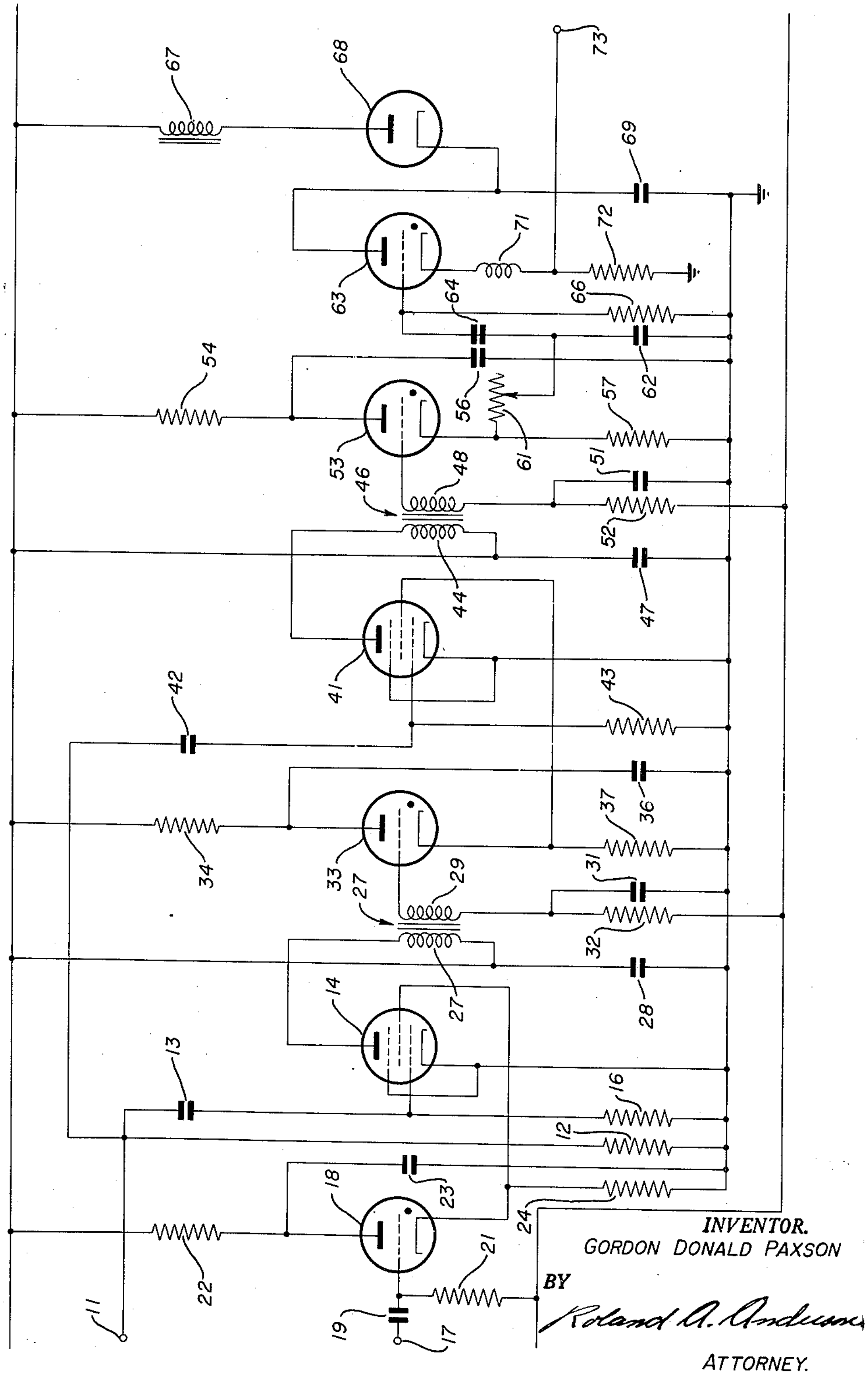
INVENTOR.
GORDON DONALD PAXSON
BY
Roland A. Anderson
ATTORNEY.

2,769,903
Patented Nov. 6, 1956

2,769,903

PULSE FORMING NETWORK

Gordon Donald Paxson, El Cerrito, Calif., assignor to the United States of America as represented by the United States Atomic Energy Commission Application June 23, 1953, Serial No. 363,601

5 Claims. (Cl. 250—27)

The present invention relates to a pulse forming network and more particularly to a circuit for developing uniform output pulses in response to a selected value of a radio-frequency signal and a synchronizing signal.

Many types of pulse forming networks have been developed; however, such networks are not adaptable for use with frequency modulated systems to form an output pulse in response to a selected value of the frequency modulated voltage at a selected frequency. The present invention provides first and second gate sections with one control element of each coupled to a source of radio-frequency signal so that a driving voltage exists only for a short interval at the peak values of the signal. The first gate section is controlled by a synchronizing signal connected thereto which opens the gate at a predetermined time. The second gate section is controlled by the output of the first gate section to trigger an output circuit. The two gate sections are used to insure proper operation and avoid difficulties which result when the time of application of the synchronizing signal coincides with the peak value of the radio-frequency signal. Incorporated in the output circuit is a delay network which may be varied so that the output pulse coincides with a selected value of the radio-frequency signal.

It is therefore an object of the invention to provide a new and improved pulse forming network.

Another object of the invention is to provide a pulse forming network adapted to be used with frequency modulated systems.

Still another object of the invention is to provide a pulse forming network for developing an output pulse in response to a selected value of a radio-frequency signal and a synchronizing signal.

A further object of the invention is to provide a pulse forming network which develops a pulse at the peak value of a radio-frequency signal at a predetermined time and includes means for delaying such pulse to occur at a time corresponding to a selected value of the signal.

Other objects and advantages of the present invention will be apparent in the following description and claims considered together with the accompanying drawing which is a schematic wiring diagram.

Referring to the drawing in detail there is provided an input terminal 11 for connection to a source of radio-frequency signal voltage (not shown). Such input terminal 11 is connected to the junction between a resistor 12 and a capacitor 13 with the other end of the resistor connected to ground so that the signal voltage is developed thereacross. The other side of the capacitor 13 is connected to the junction between the control grid of a first pentode tube 14 and a resistor 16, the other end of the latter element being directly connected to the cathode of the tube and to ground. Further connections of the pentode tube 14 will be set forth hereinafter.

There is also provided a second input terminal 17 for connection to a source of synchronizing signal voltage (not shown). Such input terminal 17 is coupled to the control grid of a first triode type gaseous discharge tube 18 through a capacitor 19. A negative bias is supplied to the control grid of such tube 18 by the connection of a resistor 21 between the control grid and the negative side of a power supply (not shown). The anode of the gaseous discharge tube 18 is connected to the positive side of the power supply (not shown) through a resistor 22 and to ground through a capacitor 23. A resistor 24 is also provided in the cathode circuit of the gaseous discharge tube 18 by connecting such resistor between the cathode and ground. The output of the gaseous discharge tube 18 is taken across the cathode resistor 23 and is utilized by making a direct connection from the cathode of the tube to the screen grid of the first pentode tube 14.

The further connections of the first pentode tube 14 include a direct connection from the suppressor grid to the cathode and a connection from the anode through one winding 26 of a pulse transformer 27 to the positive side of the power supply. A by-pass capacitor 28 is connected from the power supply side of the winding 24 to ground. One side of the other winding 29 of the transformer 27 is connected to ground through a by-pass capacitor 31 and to the negative side of the power supply through a resistor 32, and the other side of the winding is directly connected to the control grid of a second triode gaseous discharge tube 33. Such second triode tube 33 is connected in a manner similar to the first triode tube 18 with a resistor 34 connected from the anode to the positive side of the power supply, a capacitor 36 connected from the anode to ground, and a resistor 37 connected from the cathode to ground.

The radio-frequency signal voltage of the input 11 is coupled to the control grid of a second pentode tube 41 by connecting a capacitor 42 from the junction between the resistor 12 and capacitor 13 in the control grid circuit of the first pentode tube 14 to the control grid of the second pentode tube 41. A resistor 43 is connected from the control grid of such second pentode tube to ground to develop the voltage supplied thereto from the input 11. Other connections of the second pentode tube 41 include a direct connection from the cathode to ground and to the suppressor grid, a direct connection from the screen grid to the cathode of the second triode tube 33, and a connection from the anode to the positive side of the power supply through a winding 44 of a pulse transformer 46. Such winding 44 is by-passed by a capacitor 47 connected from the power supply side to ground.

The pulse transformer 46 serves to couple the output of the second pentode tube 41, as it appears in the anode circuit thereof, to the following stage. Thus, one end of the other winding 48 of the transformer 46 is connected to ground through a capacitor 51 and to the negative side of the power supply through a resistor 52, and the other end of the winding is directly connected to the control grid of a third triode type gaseous discharge tube 53. Such triode tube 53 is connected in a manner similar to the second triode tube 33 with the anode connected to the positive side of the power supply through a resistor 54 and to ground through a capacitor 56, and the cathode connected to ground through a resistor 57.

A potentiometer 61 is connected with one end to the cathode of the third triode tube and with the adjustable element thereof connected to ground through a capacitor 62. Such potentiometer 61 and capacitor 62 arrangement permits variation of the charge time of the capacitor and so the peak value of voltage across the capacitor may be utilized as a trigger voltage which lags the leading edge of the voltage developed across the cathode resistor 57. The voltage across the capacitor 62 is coupled to the control grid of a fourth triode type gaseous discharge tube 63 by connecting a capacitor 64 between the junction of the potentiometer 61 and the capacitor 62 and the control grid. A resistor 66 is connected between the control grid of the fourth triode tube 63 and ground to develop the control grid voltage. A series circuit comprising an inductor 67 and a diode 68 is connected between the anode of the fourth triode tube 63 and the positive side of the power supply. Also, a capacitor 69 is connected from the anode of the fourth triode tube 63 and ground as a means of limiting the time of conduction of the tube. The cathode circuit of such fourth triode tube comprises an inductor 71 connected to the cathode and to a resistor 72, the latter also having a ground connection. The junction between the inductor 71 and resistor 72 is directly connected to an output terminal 73 so that the voltage developed across such resistor is available as the output voltage of the circuit.

Consider now the operation of the circuit, as described in the foregoing, with the power supply energized to furnish suitable operating voltages and with the input terminal 11 connected to a source of radio-frequency signal voltage. Under such circumstances, prior to the time of occurrence of a synchronizing signal voltage at the input terminal 17, no current will flow in the anode circuit of the first pentode tube 14 because the screen grid bias is substantially zero. The control grid circuit of the first pentode tube 14 comprises the resistor 12, capacitor 13, and resistor 16 and it is readily apparent that, when the positive portion of each cycle of the radio-frequency signal voltage is impressed across the resistor 12, a positive voltage is impressed upon the control grid with respect to the cathode. At the time the control grid of such first pentode tube 14 becomes positive, current flows by diode action between the control grid and cathode and results in a charge upon the capacitor 13 which tends to cut off the conduction. The values of capacitance and resistance of the two elements 13 and 16 are selected so that the time constant of the combination is long compared to the period of the signal. Thus, during the negative portions of the radio-frequency signal voltage, the diode action of the first pentode tube 14 is prevented and the capacitor 13 discharges by a small amount. At the next positive maximum value of the radio-frequency signal voltage, diode action occurs between the control grid and cathode of the first pentode tube 14 only when the charge upon the capacitor 13 has been overcome. From the foregoing it is seen that, after the start of operation of the circuit, a state of operativeness is reached whereby diode action occurs only for a short time about the peak value of the radio-frequency signal voltage and is repeated for each subsequent positive half cycle.

When a positive synchronizing signal voltage occurs at the input terminal 17, such voltage is impressed upon the control grid of the first triode tube 18 to overcome the negative bias applied from the power supply and to render the tube ready for conduction. During the time the first triode tube 18 is nonconductive because of the negative bias on the control grid, the capacitor 23, connected from the anode to ground, becomes charged to substantially the value of the positive side of the power supply. At such times as both the foregoing conditions concur in time at the first triode tube 18, the tube starts to conduct and continues to do so until the capacitor 23 discharges sufficiently to lower the anode voltage below the value of the firing voltage of the tube. The value of the cathode resistor 24 is selected so that the time constant of the capacitor 23, first triode tube 18, and resistor 24 combination is long compared to period of the radio-frequency signal voltage.

It is to be noted that the cathode of the first triode tube 18 is directly connected to the screen grid of the first pentode tube 14. Thus, during the time the first triode tube 18 is cut off, the screen grid of the first pentode tube 14 is substantially at ground potential and prevents conduction between the cathode and anode; however, when the first triode tube 18 becomes conductive, the screen grid of the first pentode tube 14 is impressed with a positive voltage so that conduction occurs between the cathode and anode in response to pulses impressed at the control grid. The resulting flow of current at each pulse through the winding 26 of the transformer 27 induces a pulse of voltage which is inductively coupled to the control grid of the second triode type gaseous discharge tube 33. It is to be noted that the voltage developed at the cathode of the first triode tube 18 is a gating voltage which is utilized to render the first pentode tube 14 conductive at a predetermined time during the cycle of the radio-frequency signal voltage. For the purposes of the present invention the duration of such gate voltage is not critical, so long as the circuit constants meet the criteria previously set forth; however, it is desirable that the rise time of the leading edge of the gate voltage occur in a substantially short time (in the order of 0.01 microsecond) to minimize delay in the gating action at the first pentode tube 14. In such respect it has been found that the first triode tube 18 and associated elements provide a rise time for the gating voltage which is within the desirable time.

The series of pulses developed in the anode circuit of the first pentode tube 14 is inductively coupled to the control grid of the second triode tube 33 in a positive sense to overcome the negative bias impressed thereupon. The circuit elements and connections of such second triode tube 33 are similar to those discussed for the first triode tube 18 so that operation is the same. The capacitor 36 connected from the anode of the second triode tube 33 to ground becomes charged during the time that the tube is nonconductive and the first pulse applied to the control grid having a value sufficient to overcome the negative bias renders the tube conductive whereby the capacitor starts to discharge. Once the second triode tube 33 is rendered conductive, the control grid loses control and it is only at the time that the capacitor 36 has discharged to a value below the firing voltage of the tube that the control grid regains control. Thus, a second gate voltage of rectangular wave form is developed across the cathode resistor 37 of the second triode tube 33. Since the cathode of the second triode tube 33 is directly connected to the screen grid of the second pentode tube 41, a similar situation exists as described for the first pentode tube 14. The control grid circuit of the second pentode tube 41 comprises the resistor 43, capacitor 42, and resistor 12 combination and, since the latter element is connected across the input 11, diode action occurs between the control grid and cathode at the peak values of the radio-frequency signal voltage. Therefore, during the time that the second gate voltage is positive at the screen grid of the second pentode tube 41, a series of pulses corresponding to the peak values of the positive portions of the radio-frequency signal voltage is developed in the anode circuit.

The fact that the synchronizing signal voltage may occur at any time during the cycle of the radio-frequency signal voltage renders it possible for the first gate voltage at the cathode of the first triode tube 18 to start substantially in coincidence with the peak value of the radio-frequency signal voltage. When such circumstance occurs, the value of the pulse developed in the anode circuit of the first pentode tube 14 may be less than that which is required for operation of the circuit which follows. To overcome such operation the second triode tube 33 and second pentode tube 41 are utilized. At the latter tubes the inherent delay factors of the circuit are effective (such as, delay in the firing of the gaseous discharge tubes) to render the circuit operative on the second positive peak of the radio-frequency signal voltage.

The third triode tube 53 is connected in the same manner as the first and second triode tubes, 18 and 33, so that pulses inductively coupled from the anode circuit of the second pentode tube 41 cause the third triode tube to conduct and thereby develop a rectangular voltage across the cathode resistor 57. Connected to the cathode of the third triode tube 53 is the potentiometer 61 and capacitor 62 combination with the former being adjustable to vary the charging time of the latter. Thus, for the rectangular wave form of voltage impressed on the combination, the voltage across the capacitor 62 increases from a minimum to a maximum value along an exponential curve, the slope of which is determined by the setting of the potentiometer 61.

The voltage across the capacitor 62 is coupled to the control grid of the fourth triode tube 63 to control the operation thereof. It is readily apparent from the foregoing that the time at which the control grid is biased so that the fourth triode tube 63 conducts may be delayed with respect to the leading edge of the rectangular voltage developed across the cathode resistor 57 of the preceding triode tube 53. Charging current for the capacitor 69, connected from the anode of the fourth triode tube 63 to ground, is drawn through the series circuit comprising the diode tube 68 and inductor 67 so that the capacitor is charged to a voltage substantially equal to twice the value of the positive side of the power supply. Such action is known as resonant charging and occurs during the time the fourth triode tube 63 is nonconductive. When the voltage applied to the control grid of the fourth triode tube 63 renders the tube conductive, the capacitor 69 discharges through the tube, the inductor 71, and the resistor 72, the latter two elements being connected in the cathode circuit. Such is the action of the fourth triode tube 63 until the capacitor 69 has discharged to the point where conduction of the tube is no longer supported and grid control returns.

From the foregoing it is seen that a uniform pulse of voltage is developed across the cathode resistor 72 of the fourth triode tube 63 and such pulse is utilized as the output of the circuit by making a connection to the output terminal 73. Also, it is seen that the start of the output pulse may be adjusted to occur at a time corresponding to a desired value of the radio-frequency voltage impressed at the input 11. It is to be noted that the circuit will operate in the same manner whether the radio-frequency voltage is constant frequency or frequency modulated.

In practice it has been found that, by inserting the present invention into the control circuit of the deflector of a synchrocyclotron to control the time at which deflection voltage is applied, the efficiency of the synchrocyclotron is increased by as much as forty percent. The increase in efficiency results because there is less scattering of the beam of charged particles when the deflector voltage is applied at a critical time which is a function of voltage build-up time and azimuthal position of the particles. Thus, with the input 11 connected to the frequency modulated accelerating voltage of the synchrocyclotron and the output terminal 73 connected to the control terminal of the deflector voltage power supply, a synchronizing voltage is impressed at the input terminal 17 corresponding to a certain frequency of the accelerating voltage. Such connections result in substantially the proper timing and fine control may be gained by adjusting the potentiometer 61 so that the deflector voltage has reached maximum voltage by the time the beam enters the deflectors to minimize scattering.

The present invention is not limited as to frequency in its operation and therefore is useful for synchronizing purposes with respect to oscilloscopes at frequencies above five megacycles.

While the salient features of the invention have been described in detail with respect to one embodiment, it will be apparent that numerous modifications may be made within the spirit and scope of the invention, and it is therefore not intended that the invention be limited to the exact details shown except insofar as they may be defined in the following claims.

What is claimed is:

1. In a pulse forming network, the combination comprising a first coincidence circuit having a pair of inputs and an output, one of said inputs adapted to be connected to a source of radio-frequency signal voltage, the other of said inputs adapted to be connected to a source of synchronizing voltage, said first coincidence circuit including peaking means forming pulses at peak values of said signal voltage, a second coincidence circuit having a pair of inputs and an output, one of said inputs adapted to be connected to said source of radio-frequency signal voltage, the other of said inputs being connected to the output of said first coincidence circuit, said second coincidence circuit also including peaking means forming pulses at peak values of said signal voltage, a triode gaseous discharge tube having a control grid coupled to the output of said second coincidence circuit and adapted to develop a rectangular voltage in a cathode circuit of such tube in response to the output of said second coincidence circuit, a resonant charging output circuit, and a variable resistance-capacitance network connected between the cathode of said triode tube and said resonant charging circuit.

2. In a pulse forming network, the combination comprising a first terminal for connecting to a source of radio-frequency signal voltage, a first vacuum tube having two control elements, circuit means connected between said first terminal and the first control element of said first vacuum tube for rendering such first control element positive only at peak values of said signal voltage, a second terminal for connecting to a source of synchronizing voltage, a first triode gaseous discharge tube having a control grid coupled to said second terminal, the second control element of said first vacuum tube being connected to a cathode circuit of said first triode tube, a second vacuum tube having two control elements, circuit means connected between said first terminal and the first control element of said second vacuum tube for rendering such control element positive only at peak values of said signal voltage, a second triode gaseous discharge tube having a control grid inductively coupled to an anode circuit of said first vacuum tube, the second control element of said second vacuum tube being connected to a cathode of said second triode tube, a third triode gaseous discharge tube having a control grid inductively coupled to an anode circuit of said second vacuum tube, a resonant charging output circuit, and a variable network connected between a cathode circuit of said third triode tube and said resonant charging circuit whereby operation of the latter circuit may be altered in time.

3. In a pulse forming network, the combination comprising a first terminal for connecting to a source of radio-frequency signal voltage, a first vacuum tube having two control elements, a first capacitor-resistor network connected between said terminal and one control element of said first vacuum tube whereby such control element is biased positively only at peak values of said signal voltage, means interconnecting the second control element of said first vacuum tube and a source of synchronizing voltage, a second vacuum tube having two control elements, a second capacitor-resistor network connected between said first terminal and one control element of said second vacuum tube whereby such control element is biased positively only at peak values of said signal voltage, a first triode gaseous discharge tube having a control grid inductively coupled to an anode circuit of said first vacuum tube and a charging capacitor connected across such first triode tube and a cathode circuit of such tube, the second control element of said second vacuum tube being connected to the cathode circuit of said first triode tube, a second gaseous discharge tube having a control grid inductively coupled to an anode circuit of said second vacuum tube and a charging capacitor connected across such second triode tube and a cathode circuit of such tube, a resonant charging output circuit, and a variable capacitor-resistor network connected between the cathode circuit of said second triode tube and said resonant charging circuit whereby operation of the latter circuit may be altered in time.

4. The combination of claim 3 wherein said first and second capacitor-resistor networks are further characterized by a time constant which is long compared to the repetition rate of said radio-frequency signal voltage.

5. The combination of claim 3 wherein said radio-frequency signal voltage is frequency modulated and said synchronizing voltage occurs at a selected value of frequency in the excursion of said frequency modulation.

References Cited in the file of this patent

UNITED STATES PATENTS

| | | |
|---|---|---|
| 2,418,116 | Grieg | Apr. 1, 1947 |
| 2,564,692 | Hoeppner | Aug. 21, 1951 |
| 2,637,810 | Moerman | May 5, 1953 |